United States Patent

Ohmon et al.

Patent Number: 5,471,895
Date of Patent: Dec. 5, 1995

[54] CAMSHAFT DRIVING MECHANISM OF DOUBLE OVERHEAD CAMSHAFT ENGINE

[75] Inventors: Eisaku Ohmon, Tokorozawa, Japan; Tadasu Suzuki, Chicopee, Mass.

[73] Assignee: Tsubakimoto Chain Co., Osaka, Japan

[21] Appl. No.: 155,440

[22] Filed: Nov. 19, 1993

[30] Foreign Application Priority Data

Jan. 18, 1993 [JP] Japan ................. 5-003639

[51] Int. Cl.⁶ ................. F16H 53/00; F16H 7/12
[52] U.S. Cl. ................. 74/567; 474/133; 474/134; 123/30.17
[58] Field of Search ................. 74/606 R, 603, 74/604, 567; 474/133, 134, 110; 123/90.17

[56] References Cited

U.S. PATENT DOCUMENTS

| | | | |
|---|---|---|---|
| 3,919,893 | 11/1975 | Boehm et al. | 474/134 |
| 4,019,397 | 4/1977 | Bochan | 474/134 X |
| 4,095,579 | 6/1978 | Iwasa et al. | 74/603 X |
| 4,600,070 | 7/1986 | Thurner | 474/134 |
| 4,761,155 | 8/1988 | Kinoshita et al. | 474/110 |
| 4,781,665 | 11/1988 | Walker | 474/133 |
| 4,798,564 | 1/1989 | Benedict | 474/134 |
| 4,878,360 | 11/1989 | Viegas | 474/133 X |
| 4,957,470 | 9/1990 | Yoshikawa | 474/134 X |
| 4,959,042 | 9/1990 | Tanaka et al. | 474/134 |
| 4,981,116 | 1/1991 | Trinquard | 474/134 X |
| 5,112,281 | 5/1992 | Minato et al. | 474/133 X |

FOREIGN PATENT DOCUMENTS

| | | | |
|---|---|---|---|
| 2816000 | 10/1979 | Germany | 474/133 |
| 63-29002 | 2/1988 | Japan | 123/90.17 |
| 3-260448 | 11/1991 | Japan | 474/133 |
| 4-39124 | 2/1992 | Japan | 74/606 R |
| 4-339021 | 11/1992 | Japan | 74/606 R |

*Primary Examiner*—Vinh T. Luong
*Attorney, Agent, or Firm*—Flynn, Thiel, Boutell & Tanis

[57] ABSTRACT

A camshaft driving mechanism for driving camshaft wheel members secured to two camshafts in a cylinder head through a power transmitting member mounted between a crankshaft wheel member and the camshaft wheel members; in this driving mechanism, the thickness of the camshaft wheel members is one-half or less of the width of the power transmitting member, one of the camshaft wheel members is offset in an axial direction from the other camshaft wheel member, and the camshaft wheel members partly radially overlap, or one of the camshaft wheel member has a center slit in the axial direction while the other camshaft wheel member fits in the slit.

13 Claims, 5 Drawing Sheets

5,471,895

CAMSHAFT DRIVING MECHANISM OF DOUBLE OVERHEAD CAMSHAFT ENGINE

FIELD OF THE INVENTION

The present invention relates to a camshaft driving mechanism for driving two camshafts of a double overhead camshaft engine by the use of a transmitting member such as a chain, or a toothed belt.

BACKGROUND OF THE INVENTION

FIG. 7 is a front view of a prior-art camshaft driving mechanism. In a four-cycle engine, parallel camshafts 50 and 52 must rotate at one-half of the speed of a crankshaft 53. Therefore the outside diameter of camshaft wheel members 54 and 56, which are driven by a power transmitting member such as a chain 59, is twice as large as that of a driving crankshaft wheel member 58. The cylinder head (not shown) for the engine thus becomes larger with an increase in the size of the camshaft wheel members 54 and 56, and inevitably results in an increase in the total weight of the engine.

As a solution to the above-described problem, there have been proposed the arrangements shown in FIGS. 8 and 9. In FIG. 8 the power transmitting member 59 drives only the crankshaft wheel 54, and the camshafts 50 and 52 mount thereon smaller diameter driving wheels 64 and 66 which are drivingly coupled through another flexible power transmitting member 62. In FIG. 9, the crankshaft driving wheel 58 drives an intermediate wheel 80 through the first power transmitting member 72, a further smaller-diameter intermediate wheel 82 is coaxially driven from wheel 80, and wheel 82 drives a second power transmitting element 78 which in turn drives the smaller diameter wheels 74 and 76 which are secured to the camshafts. These solutions, however, tend to give rise to other problems, i.e., an increase in the number of component parts, and accordingly an increase in the weight and thickness of the engine.

The present invention has solved the problem stated above by adopting an arrangement wherein the camshaft driving mechanism has the two camshafts in the cylinder head and drives the camshafts through a power transmitting member mounted between the crankshaft wheel member and the camshaft wheel members which are fixedly mounted on the camshafts. In this camshaft driving mechanism, the thickness of at least one of the camshaft wheel members is one-half or less of the width of the power transmitting member, one of the camshaft wheel members is offset in the axial direction from the other camshaft wheel member, and the camshaft wheel members partly overlap one anther in the radial direction, or one of the camshaft wheel member has a center slit in the axial direction while the other camshaft wheel member fits in the slit.

According to the present invention, the two camshaft wheel members are driven by the power transmitting member installed between these camshaft wheel members and the crankshaft wheel member. Since the camshaft wheel members are radially overlapped without interfering with each other, there is a short center distance (i.e. the perpendicular distance or spacing) between the two camshafts. If is, therefore, possible to use a small cylinder head to thereby reduce the total weight of the engine.

Hereinafter an exemplary embodiment of the camshaft driving mechanism according to the present invention will be explained with reference to the accompanying drawings.

DETAILED DESCRIPTION

Figure 1:
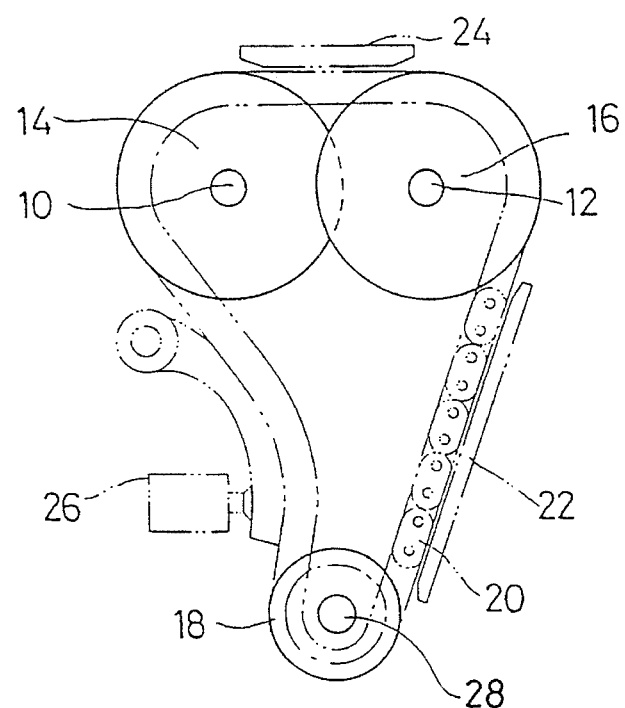
FIG. 1 is a front view of a first embodiment of a camshaft driving mechanism according to the present invention

FIG. 1 shows a first embodiment of the camshaft driving mechanism of this invention. A double overhead camshaft engine has a pair of camshafts for a single row of cylinders. For example, an in-line multicylinder engine has two camshafts, and a V-type engine and a horizontal opposed cylinder engine have four camshafts.

Fixed on the parallel rotatable camshafts 10 and 12 are driven wheel members 14 and 16, respectively. The wheel members 14 and 16 are driven by a flexible power transmitting member 20 mounted between the wheel members 14 and 16 and a crankshaft driving wheel member 18 which is fixed on the crankshaft 28. The power transmitting member 20 employed is a chain, a toothed belt, or a silent chain. In the case of the present embodiment, a chain is used as the power transmitting member 20, and the wheel members 14, 16 and 18 are chain sprockets. When a toothed belt is used as member 20, then toothed pulleys are adopted as the wheel members.

Figure 2:
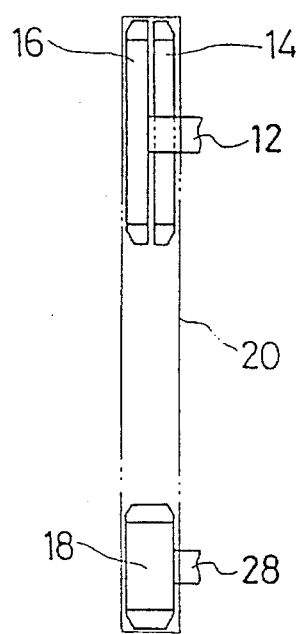
FIG. 2 is a right side view of the camshaft driving mechanism of FIG. 1.

The thickness of the camshaft sprocket wheels 14 and 16 is one-half or less of the width of the links of the chain 20 (i.e., the width of the power transmitting member) as shown in FIG. 2. One camshaft sprocket wheel 14 is axially offset from the other camshaft sprocket wheel 16. Both of the camshaft sprocket wheels 14 and 16 are mounted within the width power transmitting member (i.e. of the chain) 20. The camshaft sprocket wheels 14 and 16 are secured on the camshafts 10 and 12 respectively so that they will partly overlap one another in the radial direction.

The crankshaft sprocket wheel 18 is thick enough to engage with the chain 20 almost without a clearance between the inner links. That is, this wheel 18 preferably has a width which approximately corresponds to the width of power transmitting member 20 so as to engage member 20 substantially over this width. Reference numbers 22 and 24 denote conventional chain guides, and 26 represents a conventional chain tensioner.

The clearance or spacing, i.e., the center distance, perpendicularly between the two camshafts 10 and 12 can thus be reduced by decreasing the axial thickness of the camshaft sprocket wheels 14 and 16 to one-half or less of the width of the inner link of the chain 20, and by shifting or offsetting the camshaft sprocket wheels 14 and 16 in the axial direction to permit them to partly radially overlap.

Figure 3:
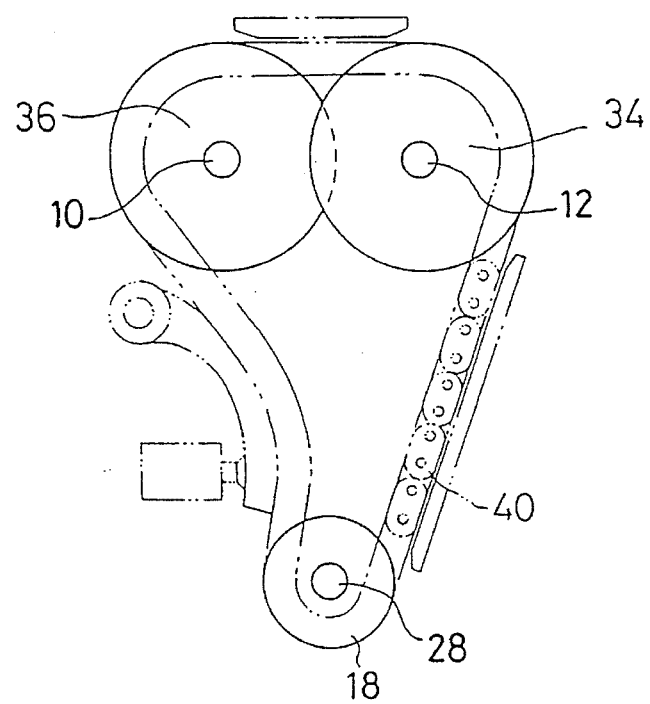
FIG. 3 is a front view of a second embodiment of the camshaft driving mechanism according to the present invention.
Figure 4:
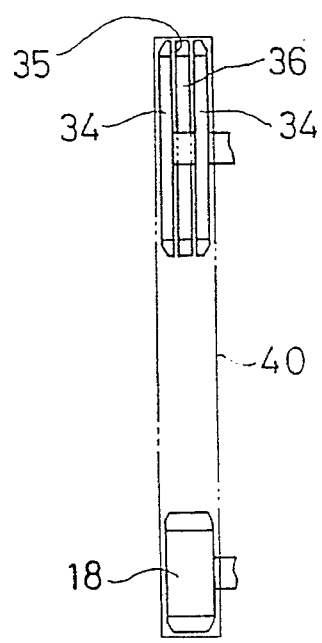
FIG. 4 is a right side view of the camshaft driving mechanism of FIG. 3.

FIGS. 3 and 4 show a second embodiment of the camshaft driving mechanism according to the present invention. One camshaft sprocket wheel 34 has a thickness nearly equal to the width of the inner links of the power transmitting member (i.e. chain) 40, and has a surrounding annular groove or slit 35 at its center in the axial direction, whereby the wheel 34 thus has two wheel parts axially separated by the annular slit 35. The other camshaft sprocket wheel 36 has a thickness which is at least slightly narrower than the width of the slit 35 so that the outer peripheral portion of wheel 36 hence fits within the slit 35. This enables the wheels 34 and 36 to radially overlap and hence reduce the center distance between the camshafts 10 and 12. The other features of this embodiment are the same as the first embodiment.

The camshaft driving mechanism of the second embodiment ensures smooth operation of the chain 40 without imposing a force or twisting moment in the width direction of the chain 40, as compared with the camshaft driving mechanism of the first embodiment.

As an example of a variation of the second embodiment, two camshaft sprocket wheels may be secured on one camshaft with a clearance provided therebetween, to thereby form a slit between the camshaft sprocket wheels. Such variation is shown in FIGS. 5 and 6.

Figure 5:
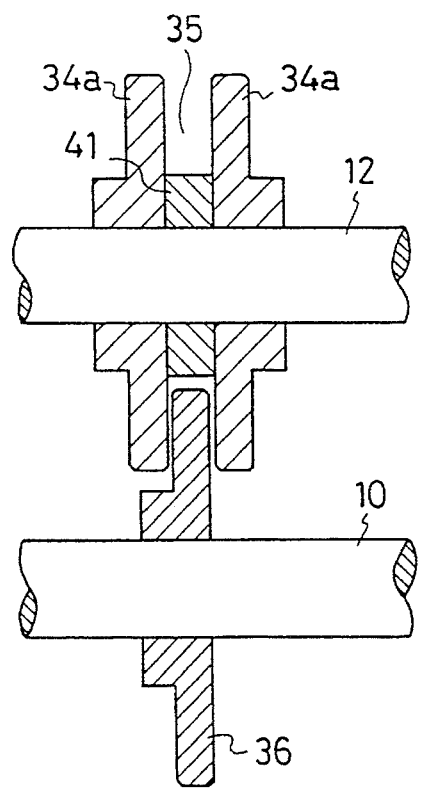
FIGS. 5 and 6 illustrate variations of the second embodiment.

For example, as shown in FIG. 5, the grooved sprocket 34 of FIG. 3 can be formed by a pair of sprockets 34a which are coaxially secured to the camshaft 12 and have a suitable spacer 41 provided therebetween to maintain an annular groove or space 35 between the two sprockets 34a. The cooperating sprocket 36 as secured on the other camshaft 10 is positioned so that its peripheral portion projects into the annular slit 35 so that the sprocket 36 radially overlaps and is effectively partially sandwiched between the sprockets 34a, thereby permitting the camshafts 10 and 12 to be positioned more closely adjacent. At the same time, the power transmitting element (such as the chain 40 of FIG. 3) is of a width such that it engages both sprockets 34a, and also engages the sprocket 36. All of these sprockets are generally identically configured.

Figure 6:
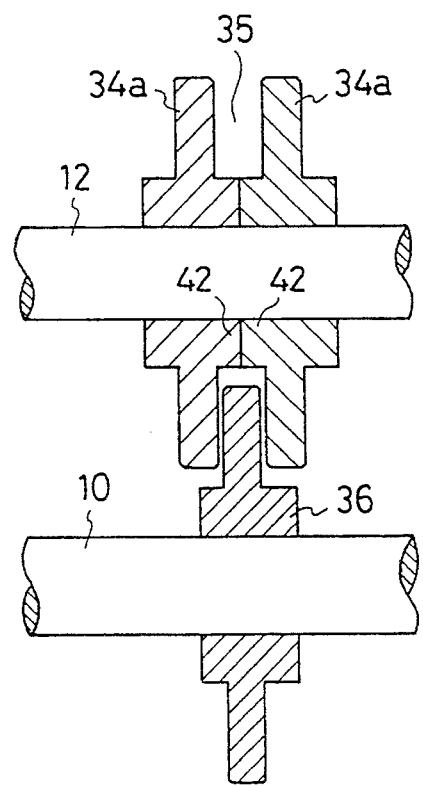
Figure 7:
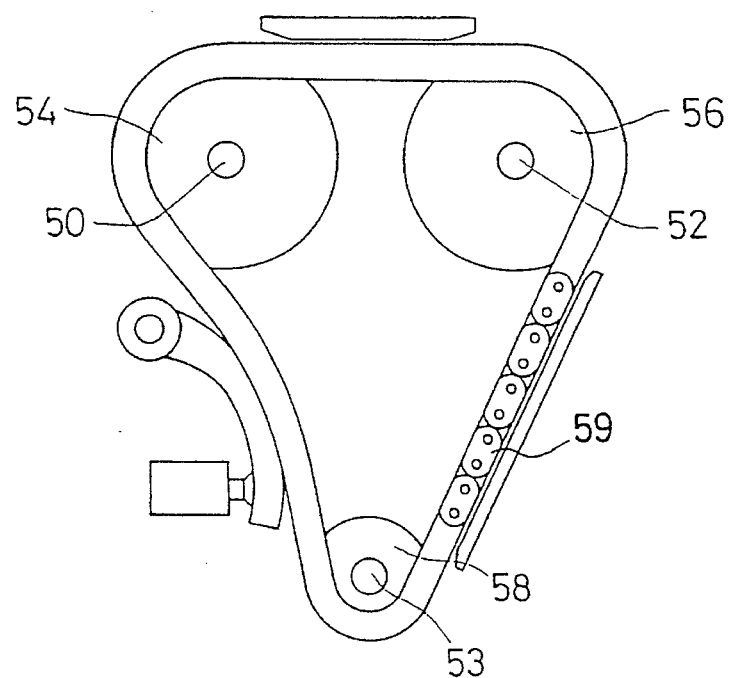
FIG. 7 is a front view of a conventional camshaft driving mechanism.
Figure 8:
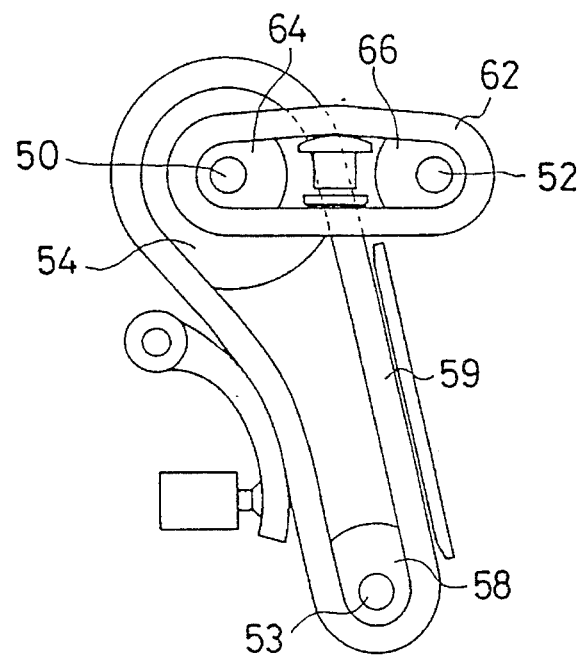
FIG. 8 is a front view of another conventional camshaft driving mechanism.
Figure 9:
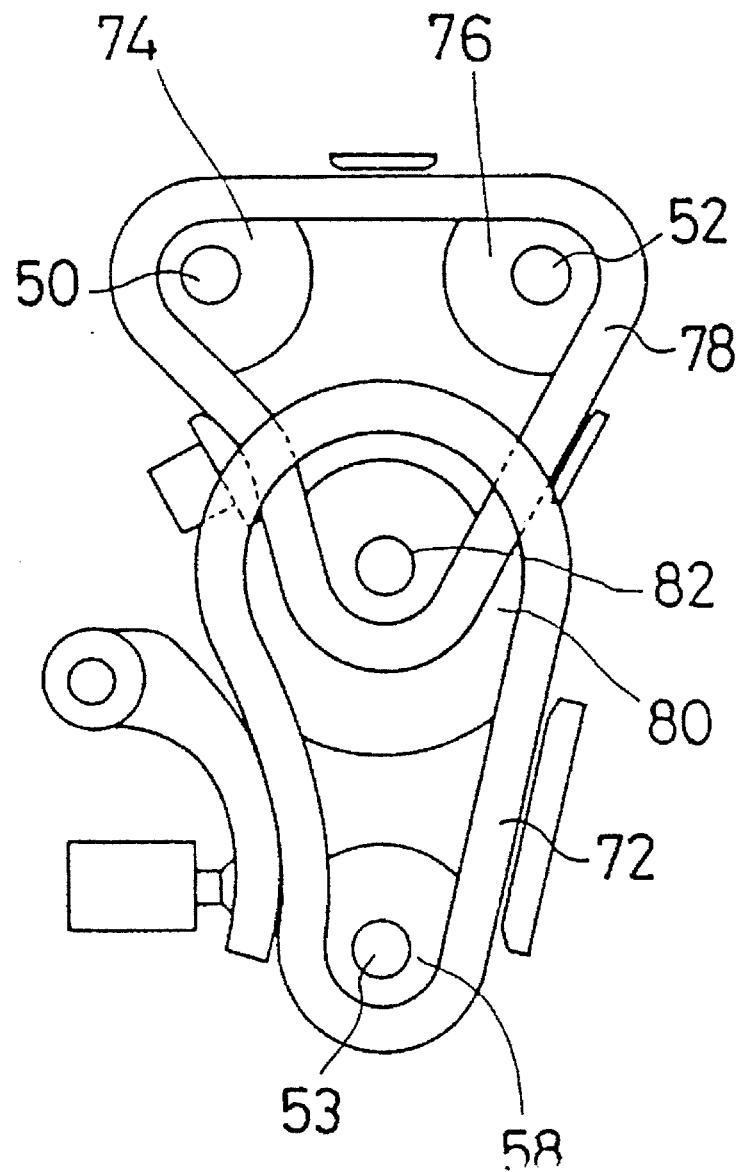
FIG. 9 a front view of a further conventional camshaft driving mechanism.

Rather than using a spacer between the sprockets 34a as indicated by FIG. 5, the sprockets 34a can, as illustrated by FIG. 6, be provided with hub portions 42 secured thereto and projecting axially beyond the width of the tooth portions of the sprockets. These hub portions 42 can axially abut to maintain the two sprocket wheels 34a axially adjacent so that they effectively function as a single sprocket wheel, but at the same time define the surrounding annular groove or slit 35 therebetween into which the other sprocket wheel 36 projects. This FIG. 6 variation is otherwise the same as the FIG. 5 variation described above.

According to the first embodiment, the clearance or center distance between the two camshafts can be reduced and moreover the camshaft wheel members can be driven by a single power transmitting member. It is therefore possible to use a small-size cylinder head, thereby reducing the total weight of the engine.

According to the second embodiment, in addition to the effect of the first embodiment, the moment working in the direction of width of the power transmitting member can be eliminated to thereby ensure smooth operation of the power transmitting member.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a camshaft driving mechanism for driving camshaft wheel members respectively secured to two camshafts through a power transmitting member connected between said camshaft wheel members and a crankshaft wheel member, the improvement wherein the thickness of each said camshaft wheel member is one-half or less of the width of said power transmitting member, one of said camshaft wheel members is offset in an axial direction of said camshafts from said other camshaft wheel member, and said camshaft wheel members are partly radially overlapped with one another.

2. A camshaft driving mechanism according to claim 1, wherein the power transmitting member is an endless flexible member which is engaged with said camshaft wheel members and said crankshaft wheel member for transmitting power from said crankshaft wheel member to said camshaft wheel members.

3. A camshaft driving mechanism according to claim 2, wherein said endless flexible member comprises a chain.

4. A camshaft driving mechanism according to claim 3, wherein said chain has a predetermined width, and said camshaft wheel members are both mounted within the width of said chain.

5. A camshaft driving mechanism according to claim 4, wherein said crankshaft wheel member has a width which corresponds to the width of the chain.

6. In a camshaft driving mechanism having first and second driven camshaft wheel members respectively supported for rotation about first and second axes which are parallel but transversely spaced apart, a driving crankshaft wheel member supported for rotation about a third axis which is parallel with and transversely spaced from said first and second axes, and an endless flexible power transmitting member engaged with said first and second camshaft wheel members and said crankshaft wheel member for transmitting power from said crankshaft wheel member to said camshaft wheel members, said power transmitting member having a predetermined width, comprising the improvement wherein each of said first and second camshaft wheel members has a peripheral annular engaging region which is maintained in engagement with the power transmitting member, the peripheral engaging region on each of said first and second camshaft wheel members being less than the width of the power transmitting member, the transverse spacing between said first and second axes being less than diameters of perimeters of said first and second camshaft wheel members so that the peripheral annular engaging regions of said first and second camshaft wheel members radially overlap one another, the annular peripheral engaging regions of said first and second camshaft wheel members being offset axially from one another so as to engage different longitudinally extending regions of said endless power transmitting member, said different longitudinally extending regions being offset in the widthwise direction of the power transmitting member.

7. A camshaft driving mechanism according to claim 6, wherein each of the peripheral annular engaging regions of the first and second camshaft wheel members has an axial width which is one-half or less the width of the power transmitting member, said first and second camshaft wheel members having the respective annular engaging regions thereof disposed in engagement with the power transmitting member adjacent opposite sides edges thereof so that the first and second camshaft wheel members radially overlap without interfering with one another.

8. A camshaft driving mechanism according to claim 6, wherein said crankshaft wheel member has an annular peripheral engaging portion maintained in engagement with said power transmitting member, the annular peripheral engaging portion of said crankshaft wheel member having an axial width which corresponds to the width of the power transmitting member.

9. A camshaft driving mechanism according to claim 6, wherein the first and second camshaft wheel members have a combined axial width which corresponds to the width of the power transmitting member.

10. A camshaft driving mechanism according to claim 9, wherein the power transmitting member comprises an endless chain.

11. A camshaft driving mechanism according to claim 6, wherein the power transmitting member comprises an endless chain.

12. A camshaft driving mechanism according to claim 6, wherein said first camshaft wheel member has a surrounding annular slit disposed at the center thereof so that the respective peripheral annular engaging region is divided into two parts disposed on opposite sides of the slit, and wherein the second camshaft wheel member has a surrounding annular part which defines thereon the respective peripheral annular engaging region and which projects radially into the slit so that the first and second camshaft wheel a members at least partially radially overlap.

13. A camshaft driving mechanism according to claim 12, wherein the first camshaft wheel member is defined by two separate camshaft wheels which are nonrotatably secured with respect to one another in closely adjacent and predetermined axial relationship to one another to define the surrounding annular slit therebetween.

* * * * *

UNITED STATES PATENT AND TRADEMARK OFFICE
CERTIFICATE OF CORRECTION

PATENT NO. : 5 471 895
DATED : December 5, 1995
INVENTOR(S) : Eisaku Ohmon et al It is certified that error appears in the above-indentified patent and that said Letters Patent is hereby corrected as shown below:

Column 6, line 8; change "wheel a members" to
---wheel members---.

Signed and Sealed this

Sixteenth Day of July, 1996

Attest:

BRUCE LEHMAN

Attesting Officer     Commissioner of Patents and Trademarks